April 26, 1938.  C. G. SUTTON  2,115,347
GAUGE
Filed Sept. 14, 1935  2 Sheets-Sheet 1
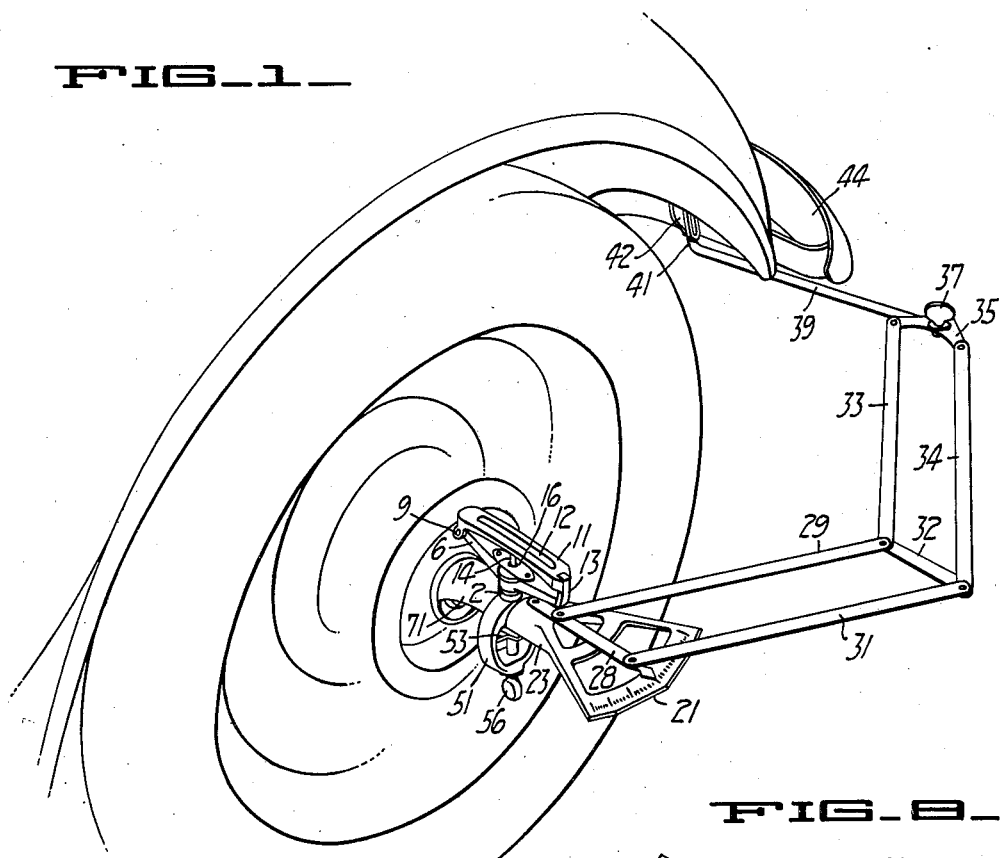
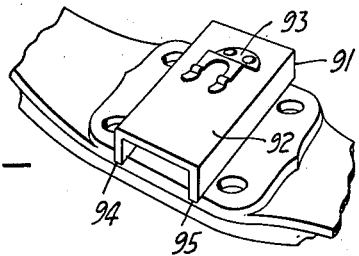
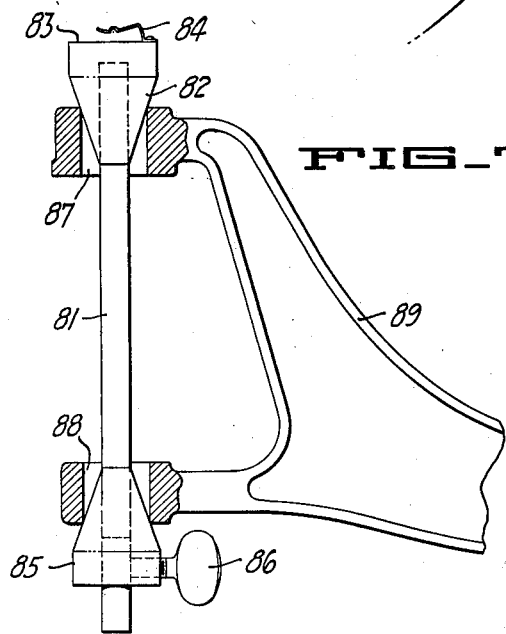
INVENTOR.
Charles G. Sutton
BY
ATTORNEY.

April 26, 1938.   C. G. SUTTON   2,115,347
GAUGE
Filed Sept. 14, 1935   2 Sheets-Sheet 2
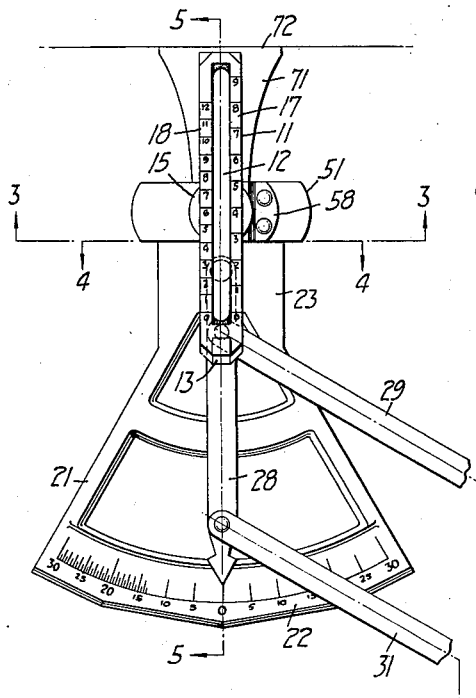
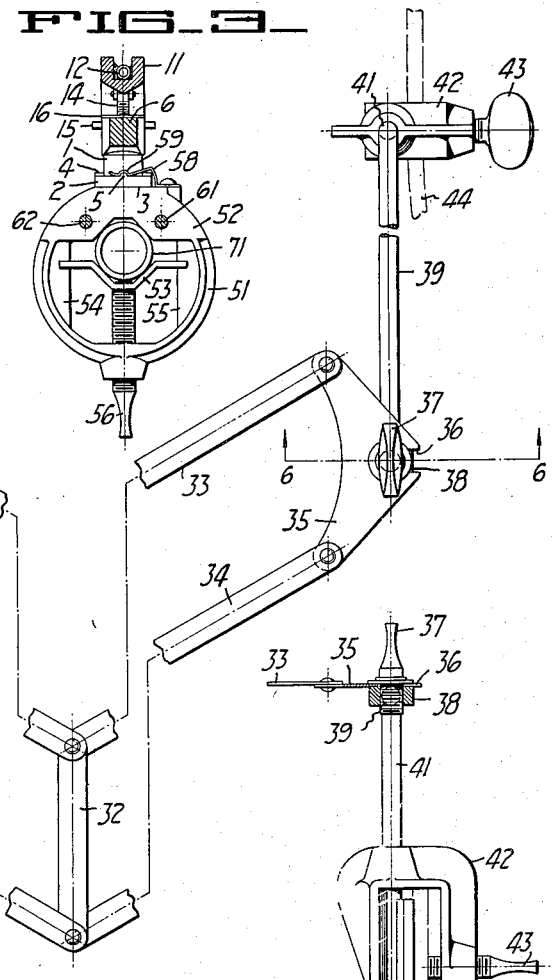
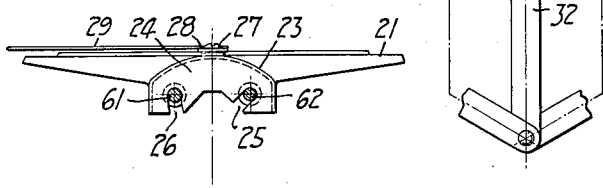
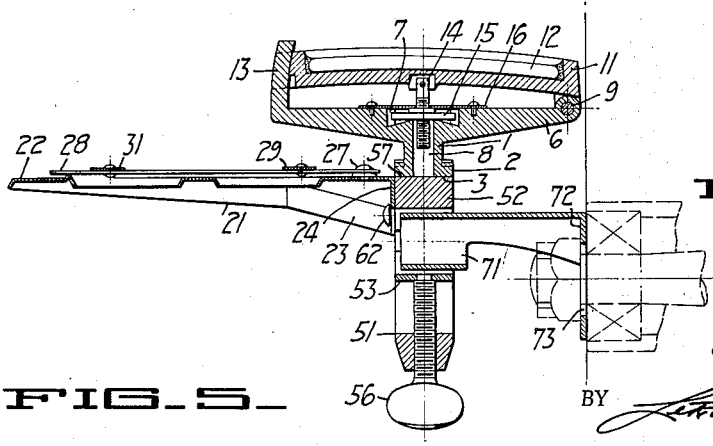
INVENTOR.
Charles G. Sutton
BY
ATTORNEY.

Patented Apr. 26, 1938

2,115,347

UNITED STATES PATENT OFFICE 2,115,347

GAUGE

Charles G. Sutton, Oakland, Calif.

Application September 14, 1935, Serial No. 40,589

11 Claims. (Cl. 33—203)

This invention relates to a device for analyzing the camber, caster, king pin slant or inclination, turning radius and other defects in the front end assembly of motor vehicles.

The proper operation of a motor vehicle such as tire wear, absence of shimmying, and ease of steering, depends among other things upon maintaining to factory specifications, all of the above characteristics and with the advent of the so called "knee action" the importance of this has become more pronounced. One of the objects of this invention is the provision of a graduated arcuate spirit level gauge adapted to be adjustably fixed to the spindle of a dirigible wheel whereby its camber can be directly read from the gauge.

Another object of the invention is the provision of a turning radius plate and parallelogram assembly adapted to be secured to the spindle of a dirigible wheel and by means of which the turning radius of a dirigible wheel may be readily determined.

Another object of the invention is the provision of a graduated arcuate spirit level gauge in combination with a turning radius plate and parallelogram assembly by means of which the caster and king pin slant or inclination of a dirigible wheel may be directly determined.

Another object of the invention is the provision of a king pin gauge holder by means of which the king pin slant may be determined with the axle removed from the vehicle.

Still another object of the invention is the provision of a spring saddle gauge holder which enables the determination of any misalignment of opposed spring saddles.

The invention possesses other advantageous features, some of which with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 1 is a perspective view of the right front wheel of an automobile with the spirit level gauge, turning radius plate and parallelogram assembly, spindle extension and ring clamp forming the objects of my invention in their operative position when making a camber determination.

Figure 2 is a top plan view of the spirit level gauge, turning radius plate and parallelogram assembly, spindle extension and ring clamp.

Figure 3 is a vertical section taken on the line 3—3 of Figure 2.

Figure 4 is a vertical section taken on the line 4—4 of Figure 2.

Figure 5 is a vertical section taken on the line 5—5 of Figure 2.

Figure 6 is a vertical section taken on the line 6—6 of Figure 2 showing the bumper clamp in elevation.

Figure 7 is a side elevation partly in section of an axle with a king pin gauge holder in its operative position.

Figure 8 is a perspective view of a spring saddle gauge holder seated on a spring saddle.

Spirit level or gauge

As best shown in Figures 2, 3 and 5 my invention contemplates the use of a spirit level gauge comprising a pedestal 1 provided at its lower end with a flange 2, the lower face 3 of which should be an accurately machined flat surface. The upper face of the flange 2 is provided with a pair of right angularly disposed ridges or ribs 4 and 5 by means of which the gauge may be definitely located or keyed on its seat in either of two predetermined positions, one being at right angles to the other. Integral with the pedestal 1 is a cross member 6 provided with a central recess 7 and a concentric bore 8. Pivotally secured to one end of the cross member 6 by means of a pin 9 is an arcuate cross member 11 within which is disposed an arcuate spirit level 12. The free end of the arcuate cross member 11 is forked or bifurcated so as to slidably accommodate the vertical guide member 13 forming part of the cross member 6. Pivoted to the lower face of the arcuate cross member 11 and depending into the bore 8 is a screw 14 on which is threaded a knurled nut 15. As shown in Figure 5 the knurled nut 15 is held within the recess 7 by means of a plate 16 secured to the upper face of the cross member 6 and therefore by turning the nut the bubble of the spirit level may be made to traverse its arcuate vial. The upper face of the arcuate cross member 11 is provided on either side of the spirit level 12 with graduated scales 17 and 18, and as best shown in Figure 2 the scale 17 reads from 0° to 9° while the scale 18 reads from 0° to 12°. The fiducial marks 0, 2, 4, 6 and 8 of the scale 17 register respectively with the fiducial marks 0, 3, 6, 8 and 12 of the scale 18 and therefore it will be seen that one scale equals two-thirds of the other. The free bifurcated end of arcuate cross member 11 should be provided with a fiducial mark adapted to register with a corresponding fiducial mark on the outer face of the vertical guide member 13 when the gauge is seated on a perfectly level support and the center of the bubble is in registration with the zero fiducial marks of both scales. The center of the bubble is chosen as the point of reference in preference to one of its ends so that all readings taken will be accurate regardless of the expansion or contraction of the bubble due to temperature variations. The lower machined face 3 of the spirit level gauge is adapted to seat either on a ring clamp, a king pin gauge holder or a spring saddle gauge holder as will be described later.

*Turning radius plate and parallelogram assembly*

For the purpose of determining caster, king pin slant and turning radius, resort is had to a turning radius plate and parallelogram assembly which as shown in Figures 1, 2, 4 and 5 comprising a sector 21 provided at its outer end 22 with graduations reading from 0 to 30° in both directions, and terminating at its inner end 23 in a downwardly extending bracket 24. The bracket 24 is provided with an angularly disposed pin receiving slot 25 and with an arcuate pin receiving slot 26 by means of which the sector may be detachably locked to the ring clamp to be described later. Pivoted to the axis of the sector 21 by means of a pin or rivet 27 is a pointer 28 the free end of which is adapted to describe an arc over the graduated outer end of the sector. Pivoted to the pointer in spaced relation are a pair of links 29 and 31 which are maintained always in parallelism by means of a link 32 pivoted to their outer ends. It will therefore be seen that the pointer 28 forms with the links 29, 31 and 32 a parallelogram. A second parallelogram is formed by means of links 33 and 34 pivoted to the link 32 and held in parallelism by means of a link 35 pivoted to the outer ends of the link 33 and 34. The link 35 is provided with a slot 36 by means of which it may be clamped between a thumbscrew 37 and nut 38. Welded to the nut 38 substantially in the plane of the parallelogram above described is a rod or bar 39 terminating in a downwardly extending leg 41, adapted to be threaded thru a bumper clamp 42. As shown in Figure 6 the bumper clamp is provided with a thumbscrew 43 by means of which the clamp may be secured to the bumper 44 or any suitable stationary support.

*Ring clamp*

The ring clamp above referred to serves as a connection between the wheel spindle or an extension thereof, and the spirit level gauge and/or turning radius plate and parallelogram assembly. The clamp is best shown in Figures 2, 3 and 5, and comprises a ring 51 provided with an upper stationary V-block 52 and a lower slidable V-block 53. The outer ends of the V-block 53 are bifurcated or notched so as to slide over guide webs 54 and 55 formed integral with the ring 51. Swiveled to the base of the V-block 53 is a thumbscrew 56 which as shown in Figure 3 is threaded thru the lower part of the ring 51, and therefore serves to regulate the vertical position of the lower V-block with respect to the upper stationary V-block 52. The upper part of the ring 51 is provided with an accurately machined perfectly flat surface 57 which serves as a seat for the spirit level gauge above described. Secured to the seat so formed is a bifurcated spring clip 58 adapted to straddle the pedestal 1, and provided with recesses 59 adapted to engage the ribs 4 and 5, and to therefore lock the spirit level gauge in either of two predetermined positions with respect to the ring clamp. As above stated one of these positions is at right angles to the other so that the gauge locks either in parallelism with the wheel spindle or at right angles thereto.

The outer face of the stationary upper V-block 52 is provided with a pair of spaced headed studs 61 and 62 by means of which the sector 21 may be locked or hung from the ring clamp as best shown in Figures 4 and 5.

*Spindle extension*

As above stated the ring clamp may be secured by means of the V-blocks 52 and 53 either directly to the machined surface of a wheel spindle or indirectly thereto by means of a spindle extension. As shown in Figure 5 such an extension may comprise a tubular member 71 upon which the ring clamp may be secured, terminating in a vertical bracket 72 provided with a central opening 73, by means of which the extension may be tightly secured to the spindle and its associated bearing.

*King pin gauge holder*

When checking twists and bends in the axle with the axle removed from the car, it is desirable to substitute a king pin gauge holder for the king pin. As shown in Figure 7 this device comprises a pin 81 to the upper end of which is secured a cone 82 provided with an accurately machined upper surface 83 on which the spirit level gauge may be seated and secured thereto by means of the bifurcated spring clip 84 which may be identical in all respects to the spring clip 58 described in connection with the ring clamp. Slidably disposed on the lower end of the pin 81 is a cone 85 provided with a thumbscrew 86 by means of which the cone 85 may be secured to the pin in any predetermined position. The cones 82 and 85 are adapted to seat in the king pin holes 87 and 88 of the axle 89, and due to their conical form naturally assume a centered position.

*Spring saddle gauge holder*

Inaccuracies of alignment in the opposed spring platforms of a car may be readily detected by mounting the spirit level gauge on a spring saddle gauge holder such as shown in Figure 8, and which comprises a channel bar 91 provided with an accurately machined surface 92 on which the pedestal 1 of the spirit level gauge may be seated, and secured thereto by means of the bifurcated spring clip 93. The lower edges 94 and 95 of the legs of the channel should be ground true so that the spirit level will give an accurate indication of the alignment or misalignment of the spring saddle.

*Modifications*

One of the essentials of this invention is that the spirit level gauge be at all times definitely located with respect to the axis of the wheel spindle, the axis of the king pin or the face of the spring saddle. Obviously other connections between the spirit level gauge and the ring clamp, king pin gauge holder and spring saddle gauge holder can be resorted to and still preserve this requirement. For example, a swivel connection can be made between these members by providing a downwardly extending tapered stud on the base of the spirit level gauge and tapered sockets in the ring clamp, king pin gauge holder and saddle spring gauge holder. The spirit level could then be rotated to any desired position.

Relative motion between the sector of the turning radius plate and its associated pointer is required but instead of maintaining the pointer in parallelism with a fixed reference line and causing the sector to rotate as illustrated in the drawings and described above, the identical readings could be obtained by rigidly securing the pointer to the wheel spindle so as to rotate therewith and maintaining the sector in parallelism with a fixed reference line by means of the parallelogram assembly.

*Operation*

In making an analysis of the steering and front end assembly of a motor vehicle it is essential that the vehicle be placed on a perfectly level floor, and all tires correctly inflated. In cases where one new tire and one very badly worn are on the front wheels, an exchange should be made with one of the back tires so as to obtain equal tire diameters, or the new tire should be slightly deflated so as to obtain equal spindle heights. The right front wheel should then be set straight ahead by sighting along the front and rear brake drums, the hub caps and spindle nuts removed and the grease wiped from the spindles and outer bearing surfaces. When this has been done spindle extensions should be secured to the spindles of both front wheels by means of the spindle nuts. Ring clamps can then be secured to the spindle extensions and spirit level gauges and parallelogram assemblies secured to each wheel in the position as shown in Figure 1 and 2. The spirit level gauges should be parallel with the spindle axis. The camber of the right wheel may be read directly from its associated spirit level on the large graduated scale 17. The camber of the left wheel may be determined in the same manner by first setting the left wheel straight ahead.

To obtain a caster reading no change is made in the position of the gauges, but the right wheel is turned to the left through 20° and then the bubble of the spirit level adjusted to the zero mark by means of the knurled nut 15. The wheel is then turned to the right through 40°, that is until the pointer 28 which, it should be noted, is maintained in parallelism with its initial position, by means of the parallelogram assembly, registers with the 20° mark at the front end of the sector. In this final position the caster of the right wheel is indicated directly by the bubble of the spirit level on the small scale 18. The caster of the left hand wheel may be determined in the same manner.

The procedure required for determining the king pin slant or inclination is identical with the procedure with respect to determining the caster, except that the spirit level gauge is set at right angles to the spindle, with the zero mark of the gauge to the rear of the car. With the gauge in this position the right wheel is turned to the left through 20° as indicated by the pointer, and then the bubble of the spirit level adjusted to the zero position. The right wheel is then turned to the left through 40° so that the pointer registers with the other 20° mark on the sector. The bubble reading on the spirit level scale 18 will give the king pin slant directly in degrees.

To determine turning radius right, the right front wheel is lined up straight ahead, in which position the turning radius pointer should register with the zero degree mark of the sector. The right wheel is then turned to the left through 20° and the pointer on the turning radius plate associated with the left hand wheel will then give the turning radius right, direct in degrees. Turning radius left may be determined in a similar manner.

Each of the above determinations may be made in exactly the same manner when the front end of the car is jacked up and the wheels removed, with the exception that the ring clamp is secured directly to the wheel spindle instead of indirectly by means of the spindle extension.

Twists and bends in an axle may be determined when the axle is removed from the car by substituting the king pin gauge holder for the king pin as shown in Figure 7, and securing the spirit level gauges in place by means of spring clips 84. The gauges on each end of the axle should be turned with their zero degrees toward the center of the axle and parallel thereto. The king pin slant is then read directly in degrees on the scale 17. By turning the spirit levels at right angles to the axle with their zero degree marks pointing in the same direction the difference in the readings of the two gauges will indicate any twist that the axle may have.

Misalignment between spring platforms may be determined by placing a spring saddle gauge on each of the opposed spring saddles and securing the spirit level gauges in place.

I claim:

1. A device for determining the caster and king pin slant of a dirigible wheel comprising: a graduated arcuate spirit level gauge provided with means for adjustably securing it either parallel with a wheel spindle or at right angles thereto; a graduated turning radius plate adapted to be fixed to said spindle and having a pointer swiveled thereto; and means for maintaining said pointer in parallelism with a fixed reference line during the rotation of said plate with the spindle.

2. A device for determining the caster and king pin slant of a dirigible wheel comprising: a graduated arcuate spirit level gauge; a ring clamp adapted to be secured to a wheel spindle; means for adjustably securing the gauge to the clamp either parallel with the axis of the spindle or at right angles thereto; a graduated turning radius plate adapted to be fixed to said clamp; a pointer swiveled to said plate; and means for maintaining said pointer in parallelism with a fixed reference line during the rotation of said plate with the spindle.

3. A device for determining the caster and king pin slant of a dirigible wheel comprising: a graduated arcuate spirit level gauge provided with means for adjustably securing it either parallel with a wheel spindle or at right angles thereto; a graduated turning radius plate adapted to be fixed to said spindle; a pointer swiveled to said plate; and a parallelogram assembly secured at one end to said pointer and adapted to be secured at its opposite free end to a fixed reference point.

4. A device for determining the caster and king pin slant of a dirigible wheel comprising: a graduated arcuate spirit level gauge; a ring clamp adapted to be secured to a wheel spindle; means for adjustably securing the gauge to the clamp either parallel with the axis of the spindle or at right angles thereto; a graduated turning radius plate adapted to be fixed to said clamp; a pointer swiveled to said plate; and a parallelogram assembly secured at one end to said pointer and adapted to be secured at its opposite free end to a fixed reference point.

5. A spirit level gauge comprising a pedestal; a cross-member integral with said pedestal; a bore extending thru said pedestal and cross-member and a counter-bore formed in the upper face of the cross-member; a graduated spirit level pivoted to one end of said cross-member so as to move in a vertical plane; a screw pivoted at one end to said spirit level and having its free end extending into said bore; a nut threaded on said screw and disposed in said counter-bore; and means for holding said nut within said counter-bore so that a rotary movement of the nut will cause the screw to move vertically.

6. A spirit level gauge comprising: a flanged pedestal provided on the upper face of its flange with right angularly disposed ribs and with an accurately machined base; a cross-member integral with said pedestal and having an upwardly extending guide member at one end; a bore extending thru said pedestal and cross-member and a counter-bore formed in the upper face of the cross-member; a graduated spirit level pivoted to the end of said cross-member opposite its upwardly extending guide member, the free end of said spirit level being bifurcated and adapted to straddle said guide member; a screw pivoted at one end to said spirit level and extending into said bore; a nut threaded on said screw and disposed in said counter-bore; and means for holding said nut within said counter-bore so that a rotary movement of the nut will cause the screw to move vertically.

7. A device for determining the turning radius of a dirigible wheel comprising a graduated sector adapted to be secured to a wheel spindle in a plane parallel to the axis of said spindle; a pointer pivoted to the vertex of said sector; and means for holding said pointer in parallelism with a fixed reference line.

8. A device for determining the turning radius of a dirigible wheel comprising a graduated sector adapted to be secured to a wheel spindle in a plane parallel to the axis of said spindle; a pointer pivoted to the vertex of said sector; and a parallelogram assembly secured at one end to said pointer and adapted to be secured at its opposite end to a fixed reference point.

9. A device for determining the turning radius of a dirigible wheel comprising a graduated sector adapted to be secured to a wheel spindle in a plane parallel to the axis of said spindle; a pointer pivoted to the vertex of said sector; and a double parallelogram secured at one end to said pointer and adapted to be secured at its opposite end to a fixed reference point.

10. A device for determining the turning radius of a dirigible wheel comprising: a graduated sector; a pointer; said sector and pointer being pivoted together for relative motion; means for securing one of these members to a wheel spindle in a plane parallel to the axis of said spindle; and means for maintaining the other member in parallelism with a fixed reference line.

11. A device for determining the turning radius of a dirigible wheel comprising: a graduated sector; a pointer pivoted to the vertex of said sector; means for securing one of said members to a wheel spindle in a plane parallel to the axis of said spindle; and a double parallelogram secured at one end to the other member and adapted to be secured at its opposite end to a fixed reference point.

CHARLES G. SUTTON.